United States Patent [19]

Ichiyanagi

[11] 4,402,586

[45] Sep. 6, 1983

[54] FOCUSING SYSTEM

[75] Inventor: Toshikazu Ichiyanagi, Mitaka, Japan

[73] Assignee: Canon Kabushiki Kaisha, Tokyo, Japan

[21] Appl. No.: 287,698

[22] Filed: Jul. 28, 1981

[30] Foreign Application Priority Data

Aug. 4, 1980 [JP] Japan ............................ 55-107575
Oct. 27, 1980 [JP] Japan ............................ 55-150380
Jan. 29, 1981 [JP] Japan ............................ 56-11825

[51] Int. Cl.³ .......................................... G03B 3/10
[52] U.S. Cl. ................................. 354/23 D; 354/25; 354/31
[58] Field of Search .................. 354/23 D, 25, 31, 195; 352/140

[56] References Cited

U.S. PATENT DOCUMENTS 4,160,590 7/1979 Reynard ........................ 354/195

*Primary Examiner*—Michael L. Gellner
*Attorney, Agent, or Firm*—Fitzpatrick, Cella, Harper & Scinto

[57] ABSTRACT

There is provided a focusing system having an autofocusing device. In the focusing system, the range for manual focusing is set beyond the range for autofocusing within which automatic focus adjustment with the autofocusing device operates. The focusing system includes means for operating the autofocusing device to operate automatic focusing of an optical system to be focus adjusted irrespective of the adjusted position of the optical system within the range of manual focusing. Thus, when autofocusing start means is operated, it is possible to automatically adjust the focus of said optical system within the range of autofocusing by the autofocusing device no matter what position the optical system has been taken within the manual focusing range.

13 Claims, 17 Drawing Figures

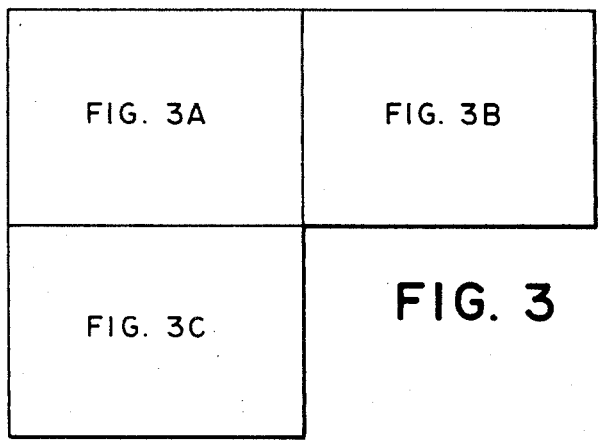
FIG. 3
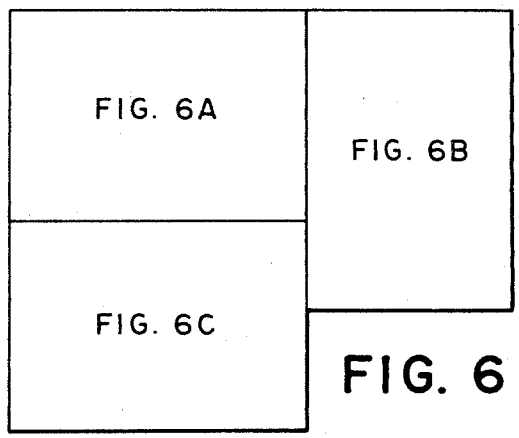
FIG. 6
H: HIGH
L: LOW
| FOCUS SIGNALS \ STATES | NEAR-(FORWARD) FOCUS | IN-FORCUS | FAR-(BACKWARD) FOCUS |
|---|---|---|---|
| MU1 | L | L | H |
| MU2 | H | L | L |
| ML1 | L | H | H |
| ML2 | H | H | L |
FIG. 5

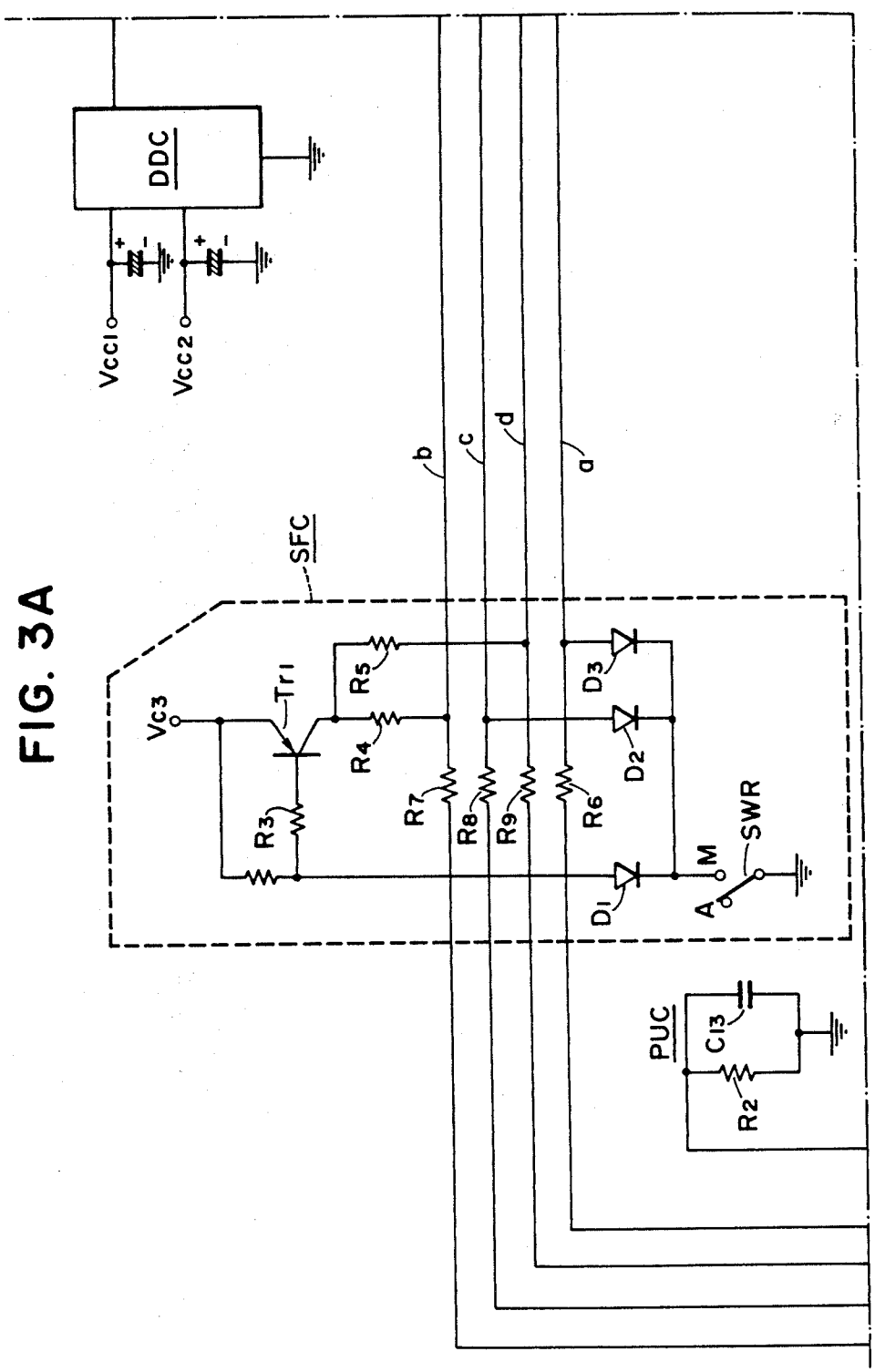

FIG. 7

| SET DIS-TANCE (m) | GRAY CODE | | | | | | BINARY CODE |
|---|---|---|---|---|---|---|---|
| | TB0 MSB | TB1 | TB2 | TB3 | TB4 | TB5 LSB | |
| ∞ | O | O | O | O | O | O | 0 |
| | O | O | O | O | O | — | 1 |
| | O | O | O | O | — | — | 2 |
| | O | O | O | O | — | O | 3 |
| | O | O | O | — | — | O | 4 |
| | O | O | O | — | — | — | 5 |
| 4.7 | O | O | O | — | O | — | 6 |
| | O | O | O | — | O | O | 7 |
| | O | O | — | — | O | O | 8 |
| | O | O | — | — | O | — | 9 |
| | O | O | — | — | — | — | 10 |
| | O | O | — | — | — | O | 11 |
| | O | O | — | O | — | O | 12 |
| | O | O | — | O | — | — | 13 |
| | O | O | — | O | O | — | 14 |
| | O | O | — | O | O | O | 15 |
| | O | — | — | O | O | O | 16 |
| | O | — | — | O | O | — | 17 |
| 2 | O | — | — | O | — | — | 18 |
| | O | — | — | O | — | O | 19 |
| | O | — | — | — | — | O | 20 |
| | O | — | — | — | — | — | 21 |

| SET DIS-TANCE (m) | GRAY CODE | | | | | | BINARY CODE |
|---|---|---|---|---|---|---|---|
| | TB0 MSB | TB1 | TB2 | TB3 | TB4 | TB5 LSB | |
| | O | — | — | — | O | — | 22 |
| | O | — | — | — | O | O | 23 |
| | O | — | O | — | O | O | 24 |
| | O | — | O | — | O | — | 25 |
| | O | — | O | — | — | — | 26 |
| | O | — | O | — | — | O | 27 |
| | O | — | O | O | — | O | 28 |
| | O | — | O | O | — | — | 29 |
| | O | — | O | O | O | — | 30 |
| | O | — | O | O | O | O | 31 |
| | — | — | O | O | O | O | 32 |
| | — | — | O | O | O | — | 33 |
| | — | — | O | O | — | — | 34 |
| | — | — | O | O | — | O | 35 |
| | — | — | O | — | — | O | 36 |
| | — | — | O | — | — | — | 37 |
| | — | — | O | — | O | — | 38 |
| | — | — | O | — | O | O | 39 |
| | — | — | — | — | O | O | 40 |
| | — | — | — | — | O | — | 41 |
| 0.45 | — | — | — | — | — | — | 42 |
| | — | — | — | — | — | O | *43 |

FOCUSING SYSTEM

BACKGROUND OF THE INVENTION

1. Field of the Invention

The present invention relates to a focusing system in an optical apparatus such as photographic camera. More particularly, the present invention relates to a type of focusing system in which selection can be made between automatic focusing by the operation of an autofocusing device and manual focusing by a manual operation.

2. Description of the Prior Art

One type of an autofocusing apparatus known in the art has set distance signal forming means interlocked with a lens to be focused and disposed to form a set distance signal corresponding to the value of distance set for the lens, distance detecting means for detecting object distance and forming a detected distance signal corresponding to the detected distance, comparing means for comparing said set distance signal with said detected distance signal to produce a comparison output and driving means for driving the lens for focal adjustment. To achieve the automatic focusing, the lens is moved until the detected distance signal becomes coincident with the set distance signal.

As readily understood, distance detecting means used in this type of apparatus has usually a limitation of its ability to detect distance. Therefore, when such autofocusing device is used, for example, in an optical apparatus such as photographic camera, it is desirable to cover the limited automatic focusing ability by manual focusing. In this case, the range set for manual focusing is beyond the range within which the autofocusing device is effective. Within the manual focusing range one can carry out focusing manually at his own will. In such an autofocusing devices, its effective range for automatic focusing is from 1.0 m to ∞. In contrast, for instance, in the case of single lens reflex camera, its taking lens has a distance adjustable range ranging from 0.5 m to ∞. In this instance, since the autofocusing range allowable for the taking lens is limited to 1.0 m–∞, it is desirable to provide a manual focusing range covering the range of 0.5 m to ∞. By doing so, it is possible to adjust the focus of the taking lens up to its own limit (in this case, its limit on the minimum distance side is 0.5 m) at least employing the manual focusing.

However, the use of combination of automatic focusing and manual focusing mentioned above brings forth a problem, in particular, when such a manual focusing range beyond the limited automatic focusing range is set in the aforementioned type of focusing system provided with an autofocusing device. The problem is that the automatic focusing of the optical system within the automatic focusing range by the autofocusing device should be when autofocusing start means is operated, irrespective of the position of the optical system, at once within the manual focusing range. Otherwise, the focusing system will be inconvenience to the user. In the system according to the prior art, the automatic focusing of the optical system by the autofocusing device can be effected at once when said autofocusing start means is operated, so long as the manually adjusted position of the optical system is within the automatic focusing range. However, if the position of the optical system is out of the automatic focusing range, automatic focusing of the optical system can not be effected at once. However, it will occur after the user has manually returned the optical system to a position within the automatic focusing range. This operation, i.e. a switch-over operation is troublesome to the user.

SUMMARY OF THE INVENTION

Accordingly, it is the general object of the invention to provide a focusing system provided with an autofocusing device which overcomes the problem of the prior art system mentioned above.

More specifically, it is an object of the invention to provide a focusing system in which the change-over from manual focusing to automatic focusing can be effected in a very simple manner without giving the user any trouble although the manual focusing range is broader than the automatic focusing range.

It is another object of the invention to provide a focusing system in which the change-over from manual focusing to automatic focusing can be performed at once when autofocusing start means is operated no matter in what position the optical system may be within the manual focusing range.

It is a further object of the invention to provide a focusing system which enables a change-over of the mode of focusing from manual to auto very easily while maintaining the merits of the simple structure and the small size of the system.

To attain the above objects according to the invention, there is provided a focusing system provided with an autofocusing device and a manual focusing range broader than the automatic focusing range for said autofocusing device which is characterized by means for making the autofocusing device operable with the operation of autofocusing start means to automatically bring an optical system to be focus adjusted to its in-focus position within the automatic focusing range irrespective of a set position of the optical system within the manual focusing range.

According to a preferred embodiment of the invention, the focusing system includes switch means which is switched over from one position to another when the optical system is adjusted to a position out of the automatic focusing range. When autofocusing start means is operated, said switching means generates a signal for automatically returning the optical system back to a position within the automatic focusing range. In the first preferred embodiment, the automatic return signal generated by said switch means is obtainable in the form of a control signal necessary of controlling optical system driving means to return the optical system back to a position within the automatic focusing range.

According to a second preferred embodiment, the focusing system includes comparing means for controlling said optical system driving means. A detected distance signal coming from means for detecting object distance and a set distance signal coming from means for forming a signal of set distance are compared with each other by said comparing means. Based on the result of the comparison, said optical system driving means is controlled to return the optical system to a position within the range for automatic focusing. In the second embodiment, the set distance signal can be obtained in the form of a substitute signal which is substituted for the set distance signal. In response to the substitute signal, said comparing means issues a comparison output to instruct said driving means to return the optical system back to a position within the range for autofocusing.

Other and further objects, features and advantages of the invention will appear more fully from the following description of preferred embodiments of the invention in connection with the accompanying drawings.

BRIEF DESCRIPTION OF THE DRAWING

FIG. 3 shows the combination of FIGS. 3A, 3B and 3C;

FIGS. 3A, 3B and 3C, in combination, is a circuit diagram, showing the electrical arrangement of the focusing system mounted in the camera shown in FIG. 1;

FIG. 5 shows various states of the focus control signals obtainable from the autofocusing device shown in FIG. 3;

FIG. 6 shows the combination of FIGS. 6A, 6B and 6C;

FIG. 7 shows the correspondence of binary data to gray code relative to adjusted distance data;

DESCRIPTION OF THE PREFERRED EMBODIMENTS

Figure 1:
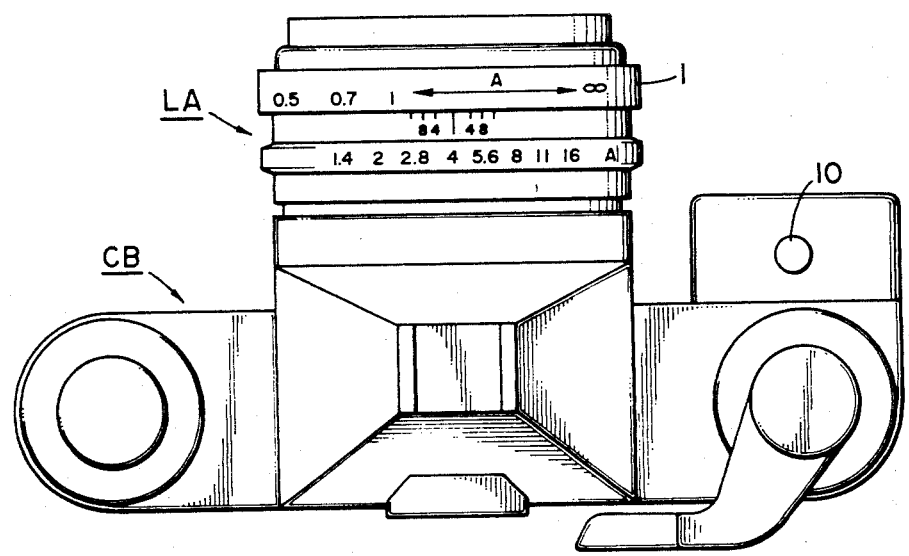
FIG. 1 is a top view of a single lens reflex camera in which an embodiment of the focusing system according to the invention is incorporated.

FIG. 1 shows a single lens reflex camera in which the present invention is embodied, CB designates the main body of the camera, LA is the taking lens thereof and 1 is a focusing ring provided for the taking lens LA. For manual focus adjustment of the taking optical system, the focusing ring 1 is operable in a known manner. 10 is an autofocusing button for actuating an autofocusing device as will be later described to perform an automatic focusing of the taking optical system.

Figure 2:
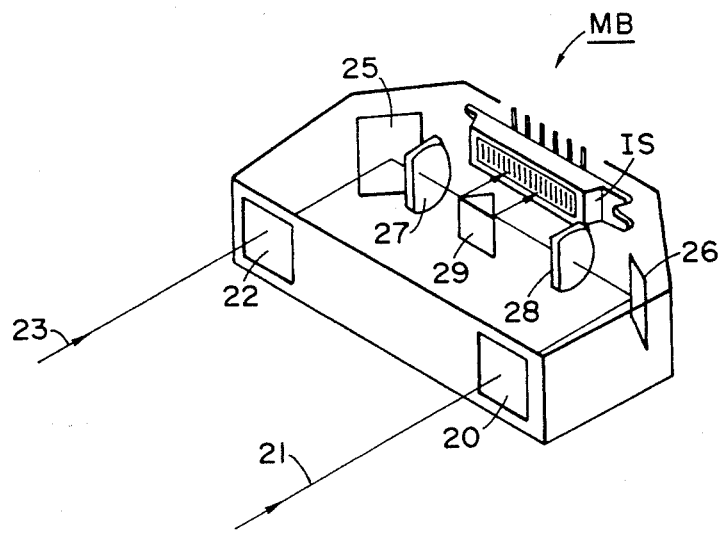
FIG. 2 is a perspective view of the distance detecting block in the autofocusing device of the system.

In FIG. 2, MB generally designates a distance detecting block of the autofocusing device in the above camera. Although not seen in FIG. 1, the distance detecting block MB is mounted on the under side of the taking lens LA in such manner that the optical axis 21, 23 of the block MB may be directed to a subject to be photographed (referred to also as object). 20 is a first distance detecting window disposed on the optical axis 21 to aim at the object. 22 is a second window having an optical axis 23 extending parallel to the optical axis 21. The second distance detecting window 22 is spaced from the first one 20 by a determined length of a reference line. IS is a line sensor. Mirrors 25, 26, lenses 27, 28 and prism 29 together constitute a distance detecting image forming optical system. The object light entering the block through the windows 20 and 22 is focused on the line sensor IS through the distance detecting image forming optical system. To this end, the line sensor IS is disposed substantially coincident with the light focusing position of the optical system.

The line sensor IS is a linear image sensor formed of, for example, photo diode array (MOS image sensor) or CCD photo array. The beam of light entering the block passing through the first window 20 will form an image at a position on the line sensor IS and the beam of light entering the block passing through the second window 22 will form an image at another position on the sensor IS. The latter image position relative to the former position is determined by a subject distance. Therefore, the subject distance can be obtained as a function of the imaging positions. The line sensor produces electric signals (image pattern scanning signals) corresponding to the patterns of images formed by the above two beams so that the subject distance can be obtained by means of the output signals.

Figure 3B:
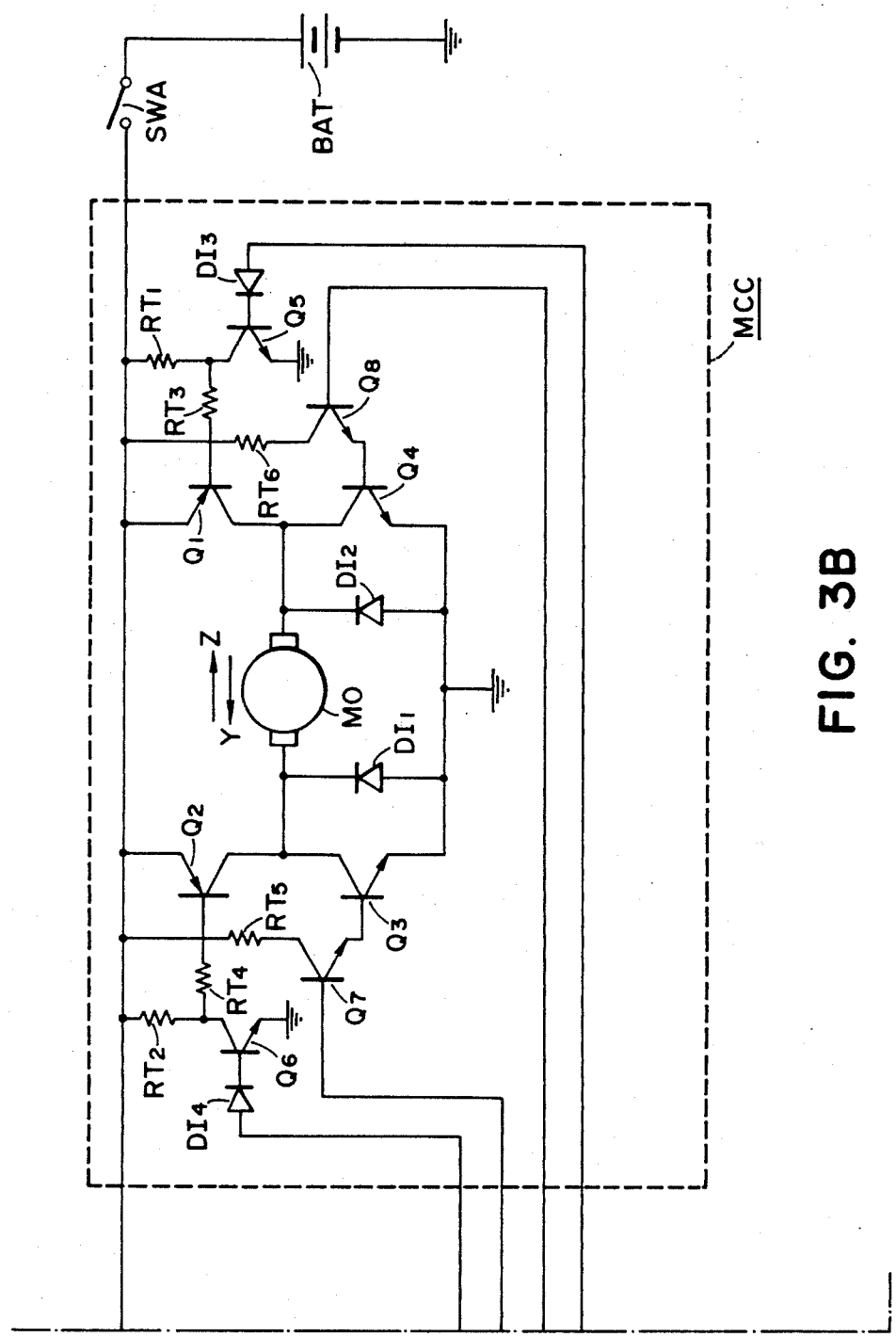
Figure 3C:
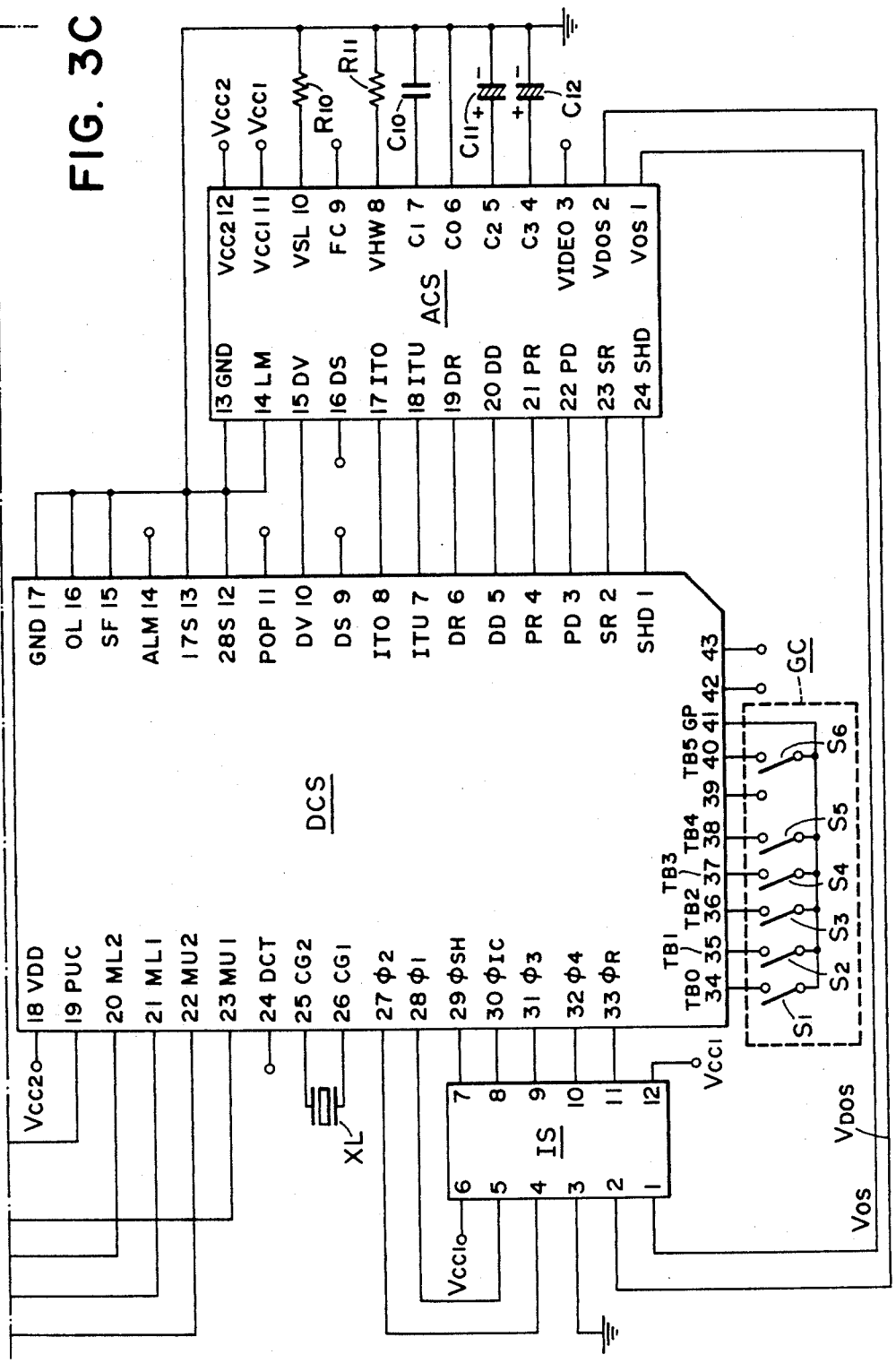

Referring to FIG. 3 showing the electrical arrangement of the focusing system mounted in the camera shown in FIG. 1, a power source battery mounted in the camera is designated by BAT. Designated by SWA is an autofocusing switch which is thrown in the circuit by pushing the autofocusing button 10 shown in FIG. 1. In the shown embodiment, power supply to all of the circuit system is started and an operation of automatic focusing is started when the autofocusing switch SWA is switched On. DDC is a DC-DC converter for transforming the source voltage of the battery BAT into two different voltages, Vcc1 and Vcc2. These voltages Vcc1 and Vcc2 are suitably applied to the parts of the circuit requiring the voltages.

The line sensor IS comprises terminals 1-12, of which the terminal 3 is connected to the circuit ground. Applied to the terminals 6 and 12 is the voltage Vcc1 from the DC-DC converter DDC. From a digital integrated circuit (hereinafter called a digital-IC) DCS which will be explained hereinafter, drive and control signals $\phi IC$, $\phi SH$, $\phi_1$–$\phi_4$ and $\phi R$ are applied to the terminals 4, 5 and 7-11 of said line sensor IS.

With this construction, image scanning signals VOS are produced from the terminal 1 of line sensor IS and from the terminal 2 there is produced a signal VDOS which represents the internal voltage fluctuation due to the supplied drive pulses.

ACS designates an analog integrated circuit (hereinafter called analog-IC), to which the image scanning signals VOS and the internal voltage fluctuation signal VDOS, each produced from the terminals 1 and 2 of the line sensor IS, are applied through the terminals 1 and 2 thereof, and wherein after noise compensation against the image scanning signals VOS (compensation of the internal voltage fluctuation noise and dark current noise) is realized, the quantization of said noise compensated image scanning signals and the discrimination of propriety of the signal integration time of the line sensor IS are carried out. Operation of analog-IC ACS is controlled by digital-IC DCS and for that purpose, control signals DR, DD, PD, SR and SHD are applied to the terminals 19-24 of the analog-IC ACS from the digital-IC DCS. The analog-IC ACS produces two kinds of quantized image element data (binary data of "0" and "1") DV and DS derived on the basis of a variable quantization standard (threshold) and a fixed quantization standard (threshold) from its terminals 15 and 16, respectively. Said analog-IC ACS produces discrimination signals ITO and ITU concerning the discrimination of the integration time of the line sensor IS from its terminals 17 and 18, respectively. To the terminals 11 and 12 of the analog-IC ACS, voltages of Vcc1 and Vcc2 are applied respectively from DC-DC converter DDC. Terminals 6, 13 and 14 of ACS are connected to the circuit ground. Terminals 7, 5 and 4 of ACS are connected to capacitors $C_{10}$, $C_{11}$ and $C_{12}$ for signal hold respectively. To the terminal 10, a register $R_1$ for adjusting the variable quantization standard (threshold) is connected. To the terminal 8, if necessary, a resistor $R_{11}$ may be connected to adjust the voltage in the analog-IC ACS. The remaining terminals 3 and 9 are not used.

Figure 4:
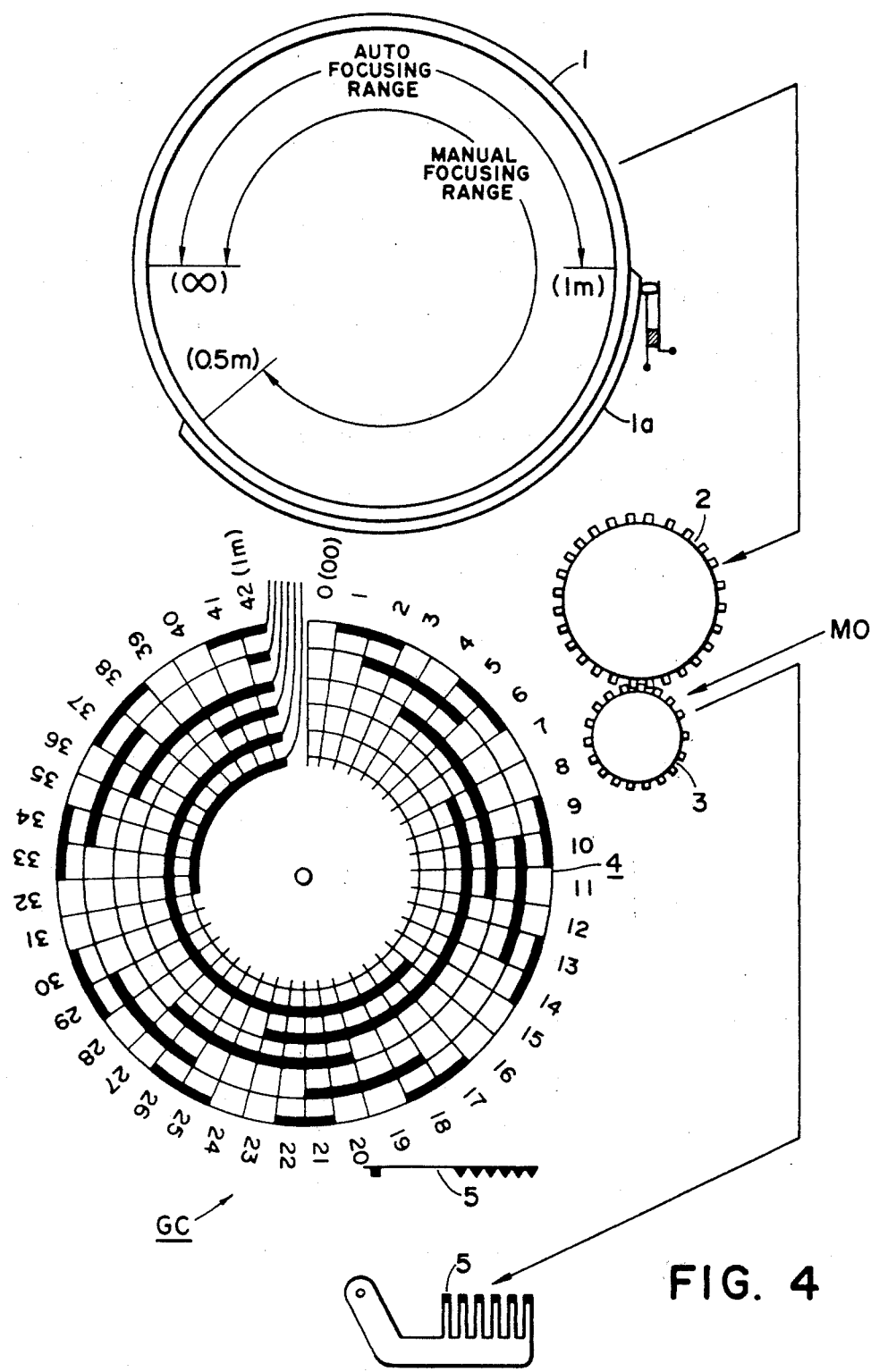
FIG. 4 is a schematic illustration showing the mutual relations among the focusing ring, set distance detecting means and the automatic return switch in the camera shown in FIG. 1.

DCS designates a digital integrated circuit (IC) effecting control of the line sensor IS and said analog-IC ACS, detection of the object distance based on quantized image element data DV or DS provided by said analog-IC ACS, and further focus detection based on the object distance data obtained by adjusted distance detecting means (gray code switches $S_1$–$S_6$) as shown in FIG. 4. Said digital-IC DCS produces drive and control signals $\phi IC$, $\phi SH$, $\phi_1$–$\phi_4$ and $\phi R$ for line sensor IS through terminals 27-33 thereof and control signals DR, DD, PR, PD, SR and SHD for analog-IC ACS through terminals 1-6 thereof. On the other hand, the digital-IC DCS receives integration time discrimination output signals ITO and ITU from the analog-IC ACS through its terminals 8 and 7, respectively, and effects control of integration time of line sensor IS by means of the signals ITO and ITU. The digital-IC DCS receives also quantized image element data DV and DS from analog-IC ACS through terminals 10 and 9 respectively and carries out the distance detection with selective use of these data DV and DS (details of selecting condition will be described later). While, the digital-IC DCS serially takes therein the adjusted distance data from said adjusted distance detecting means GC (switches $S_1$–$S_6$) through its terminal 41 (this data is 6-bits gray code digital data and is converted into 6-bits binary digital data in digital-IC DCS; a detailed description of this will be made later), and effects detection of focusing condition of the taking optical system by comparison of said adjusted distance data with object distance data (this data is 6-bits digital data) obtained through the distance detection. As a consequence of this focus detection, focus control signals MU1, MU2, ML1 and ML2 given to a motor control circuit MCC as will be described later, through terminals 20–23 of the digital-IC DCS. Terminals 12, 13, 15, 16 and 17 of DCS are connected to the circuit ground. To terminal 18, the voltage of Vcc2 is supplied from the DC-DC converter DDC. A terminal 19 is connected to a power-up-clear circuit PUC comprising a parallel connection of capacitor $C_{13}$ and resistor $R_2$, and a power-up-clear signal from this circuit PUC is given through terminal 19.

A crystal oscillator XL is connected to terminals 25 and 26 of digital-IC DCS. Based on the oscillating signal of the oscillator XL, various necessary timing pulses are formed in the digital-IC DCS. Also, terminals 34–38 and 40 are for giving predetermined timing pulses TB0–TB5 to said adjusted distance detecting means GC (switches $S_1$–$S_6$) in order to serially introduce 6-bits gray code digital data produced by said adjusted distance detecting means GC through its terminal 41. Moreover, the terminal 41 is connected to a brush member 5 which slide contacts with the code pattern on a printed circuit board 4 shown in FIG. 4, and the terminals 34–38 and 40 are connected to the respective code pattern portions. Further, a terminal 11 is made opened and the remaining terminals 42 and 43 are not used.

Line sensor IS, analog-IC ACS and digital-IC DCS described above may be of the entirely same structure as those disclosed in our copending application, U.S. Ser. No. 121,690 filed on Feb. 15, 1980. Therefore, herein, the line sensor IS, analog-IC ACS and digital-IC DCS are shown and described to have the same structures as those disclosed in the above referred copending application.

MCC is a motor control circuit for controlling a focusing motor MO on the basis of the focus control signals MU1, MU2, ML1 and ML2 provided by the digital-IC DCS through its terminals 20–23. In this motor control circuit MCC, the focusing motor MO is connected between the junction the collector of pnp-transistor $Q_1$ and the collector of npn-transistor $Q_4$ and the junction between the collector of pnp-transistor $Q_2$ and the collector of npn-transistor $Q_3$. $Q_5$, $Q_6$, $Q_7$ and $Q_8$ are npn-transistors having their bases connected to the output terminals 23, 22, 21 and 20 of the digital-IC DCS, respectively. The bases of transistors $Q_1$ and $Q_2$ and the collectors of transistors $Q_5$, $Q_6$, $Q_7$ and $Q_8$ are connected to the auto-focus switch SWA through resistors $RT_1$, $RT_2$, $RT_5$ and $RT_6$, respectively. The bases of transistors $Q_3$ and $Q_4$ are connected to the emitters of transistors $Q_7$ and $Q_8$, respectively. The collectors of $Q_5$ and $Q_6$ are connected to the bases of $Q_1$ and $Q_2$ through resistors $RT_3$ and $RT_4$ respectively. The emitters of $Q_5$ and $Q_6$ are grounded.

The bases of transistors $Q_5$ and $Q_6$ are connected to the output terminals 23 and 22 of the digital-IC DCS through diodes. Also, the emitters of $Q_1$ and $Q_2$ are connected to the output stage of the constant voltage circuit CVC and the emitters of $Q_3$ and $Q_4$ are gounded. $DI_1$ and $DI_2$ are diodes for quickly stopping the motor MO and these are reversely connected in parallel to the transistors $Q_3$ and $Q_4$, respectively.

Here, the focus control signals MU1, MU2, ML1 and ML2 from the terminals 20–23 of the digital-IC DCS are as shown in FIG. 5.

Now, assuming that the taking optical system is in near-(forward) focus state, the focus control signals MU1, MU2, ML1 and ML2 from the terminals 20–23 of the digital-IC DCS at this time are low, high, low and high, respectively, as shown in FIG. 5, and accordingly, the transistors $Q_5$ and $Q_7$ are turned off while $Q_6$ and $Q_8$ are turned on, so that transistors $Q_1$ and $Q_3$ are turned off while $Q_2$ and $Q_4$ are turned on and a current flows to the motor MO in the direction indicated by arrow Z in FIG. 3 and thus, the motor MO begins to effect normal rotation, for example. Accordingly, if design is made such that by the normal rotation of the motor MO, the taking optical system is adjusted toward the far-(backward) focus, namely toward the long distance in-focus position and that by the reverse rotation of the motor MO, the taking optical system is adjusted toward the near-(forward) focus, namely, toward the short distance in-focus position through the focusing ring 1, then the taking optical system is adjusted toward the long distance side in this case. In the course of such adjustment, when the taking optical system reaches its in-focus position with respect to the object, the effective objective distance data obtained at this time and the adjusted distance data from the adjusted distance detecting means become coincident with each other and the focus control signals MU1, MU2, ML1 and ML2 from the terminals of the digital-IC DCS become low, low, high and high, respectively, as shown in FIG. 5, whereby the transistor $Q_5$ remains turned off and $Q_8$ remains on while the transistor $Q_6$ is turned off and $Q_7$ is turned on, so that the transistor $Q_1$ remains turned off and $Q_4$ remains turned on. While the transistor $Q_2$ is turned off and $Q_3$ is turned on. Consequently, the power supply to the motor MO is cut off while, at the same time, the counter electromotive force induced by the rotation of the motor MO flows to the motor MO in the direction of arrow Y in FIG. 3 through the closed circuit of diode $DI_2$ and transistor $Q_3$, so that the motor MO is quickly stopped and thus, the taking optical system is stopped at in-focus position. On the other hand, in the case where the taking optical system is in far-(backward) focus condition, the focus control signals MU1, MU2, ML1 and ML2 from the terminals 20–23 of the digital-IC DCS become high, low, high and low, respectively, as shown in FIG. 5, which is opposite to the case of the near-(forward) focus condition. Accordingly, the transistor $Q_5$ and $Q_7$ are turned on while the transistors $Q_6$ and $Q_8$ are turned off, so that the transistors $Q_1$ and $Q_3$ are turned on while the transistors $Q_2$ and $Q_4$ are turned off and a current flows to the motor MO in the direction of arrow Y to reversely rotate the motor MO, whereby the taking optical system is adjusted toward the short distance side. When the taking optical system reaches the in-focus position, the resistor $Q_5$ is turned off and $Q_8$ is turned on, whereby the transistor $Q_1$ is turned off and $Q_4$ is turned on to cut off the power supply to the motor MO. At the time, the counter electromotive force induced by the rotation of the motor MO flows to the motor in the direction of arrow Z through the closed circuit of diode $DI_1$ and transistor $Q_4$, so that the motor MO is quickly stopped and thus, the taking optical system is stopped at the in-focus position.

Now, improvements made in the above described type of focusing system according to the invention will be described in detail.

The taking lens LA shown in FIG. 1 is focus adjustable, for example, within the range of 0.5 m–∞. Within this range, the manual focusing of the taking lens LA is possible at will by operating the focusing ring 1. On the other hand, the autofocusing device described above referring to FIGS. 2 and 3 is automatically focus adjustable, for example, within the range of 1.0 m–∞. Therefore, in the focusing system used in the shown single lens reflex camera, the manual focusing range is broader than the automatic focusing range in an amount of the portion covering 0.5 m to 1.0 m. Within this portion of range ranging from 0.5 to 1.0 m, only the manual focusing is possible.

As seen in FIG. 4, the focusing ring 1 has a cam 1a provided on a particularly, determined circumferential area of the ring. The area on which the cam 1a is provided, corresponds to the portion, 0.5 to 1.0 m of the manual focusing range beyond the auto focusing range. For the portion of the manual focusing range beyond the auto focusing range, namely, for the portion ranging from 0.5 to 1.0 m, the cam 1a brings the automatic return switch SWR into its closed position and holds the switch in the closed position through the portion. Consequently, the switch SWR will be closed whenever the taking optical system is adjusted to a position within the extra range of 0.5 to 1.0 m.

Referring to the circuit shown in FIG. 3, it includes an automatic return circuit SFC the function of which is to forcedly move the taking optical system to a position within the auto focusing range when the automatic focusing switch SWA is closed under the condition wherein the distance value of the taking optical system set by the focusing ring 1 is within the range of 0.5–1.0 m for manual focusing.

In the circuit designated by SFC, reference character SWR designates the above mentioned automatic return switch interlocked with the focusing ring 1. When the distance value set by the focusing ring 1 is smaller than 1.0 m, the automatic return switch SWR is turned on (connected to the contact M). $R_6$–$R_9$ are resistors connected to output lines a–d of the output terminals 23, 22, 21 and 20 of the digital-IC DCS, respectively. The resistor $R_6$ is connected to the switch SWR through diode $D_3$ and the resistor $R_8$ is connected to the SWR through diode $D_2$. Therefore, when the switch SWR is in contact with the contact M, the output lines a and c (MU1 and ML1) are forcedly made low irrespective of the output of the digital-IC DCS. $Tr_1$ is a transistor whose collector is connected to the lines b and d through resistors $R_4$ and $R_5$. The base of $Tr_1$ is connected to the switch SWR through diode $D_1$. Therefore, when the switch SWR is connected to the contact M, the transistor $Tr_1$ is turned on and the lines b and d (MU2 and ML2) are forcedly made high irrespective of the output of the digital-IC DCS. With such arrangement of the automatic return circuit SFC, turn-on of the switch SWA with the switch SWR being on (in the position connected with the contact M) makes the lines a and c (MU1 and ML1) low and lines b and d (MU2 and ML2) high so as to produce a state electrically equivalent to the state of near-focus as will be understood from FIG. 5. Under this state, an electric current flows to the motor MO in the direction of arrow Z to rotate it whereby the taking optical system is moved in the direction toward the auto focusing range. Subsequent to the return of the optical system to the auto focusing range, an automatic focusing operation starts without interruption to automaically control the focus of the taking optical system by the autofocusing device which has already been prepared for operation by turning on the switch SWA. By this automatic focusing operation, the taking optical system is automatically adjusted to a position within the auto focusing range, that is, the in-focus position correctly corresponding to the object distance at that time. In such case where the taking optical system is within the auto focusing range at the beginning of focusing operation, the auto focusing device starts operating, as a matter of course, immediately after the switch SWA is turned on so that the taking optical system can be automatically adjusted to the in-focus position within the auto focusing range at once. In the former case wherein the automatic focusing is started after the optical system is returned back into the auto focusing range, the switch SWB is turned off (connected to another contact A) at the time when the taking optical system has been returned to the auto focusing range. Therefore, in this case, the electrical states of lines a–d become states as determined by output signals MU1, MU2, ML1 and ML2 from the output terminals 23–20 of the digital-IC DCS (see FIG. 5).

In FIG. 4, gears 2 and 3 constitute a gear train to connect the brush member 5 of above said adjusted distance detecting means GC to the focusing ring 1.

Figure 6A:
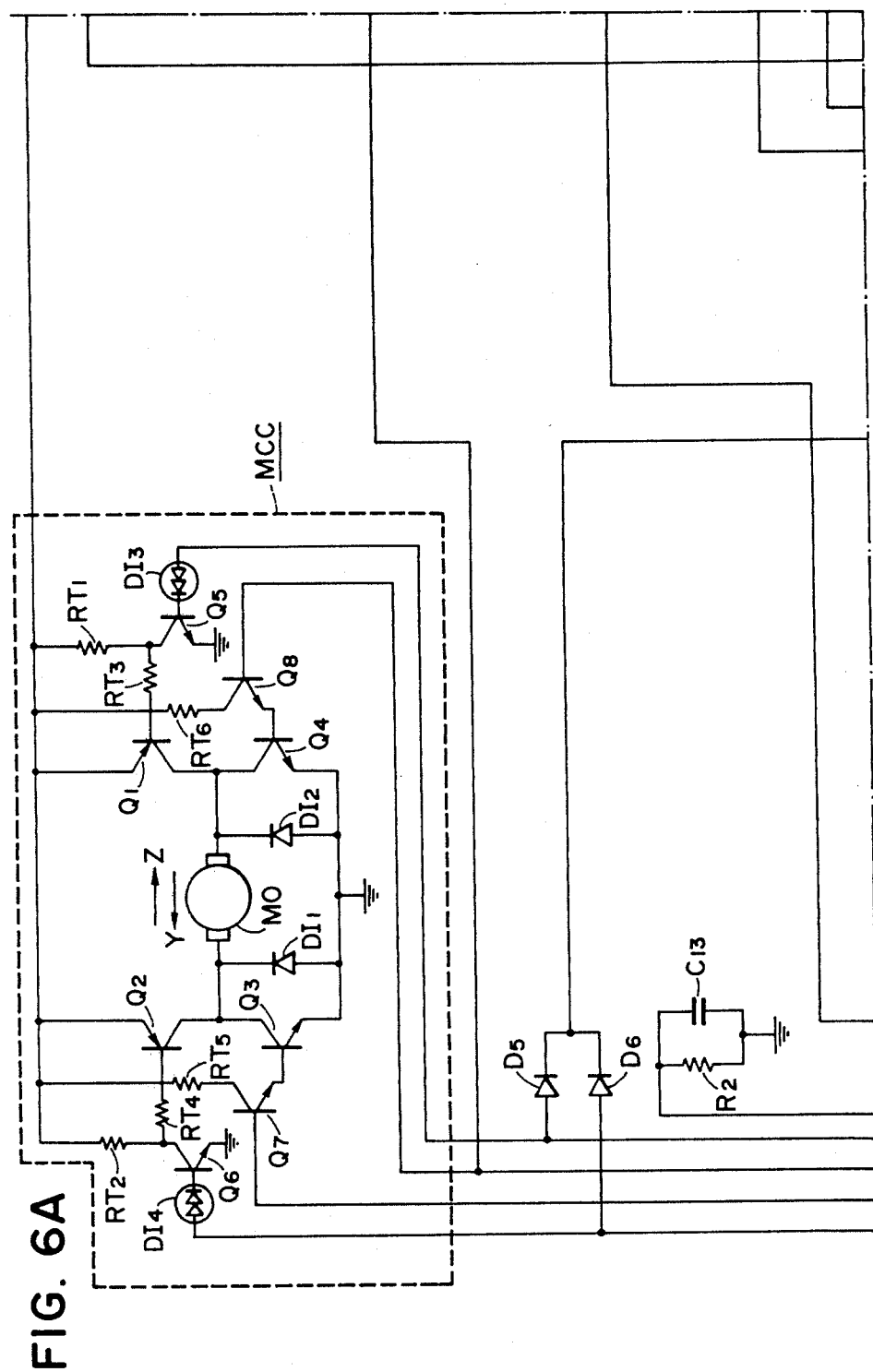
FIGS. 6A, 6B and 6C, in combination, is a circuit diagram showing another embodiment of the invention.
Figure 6B:
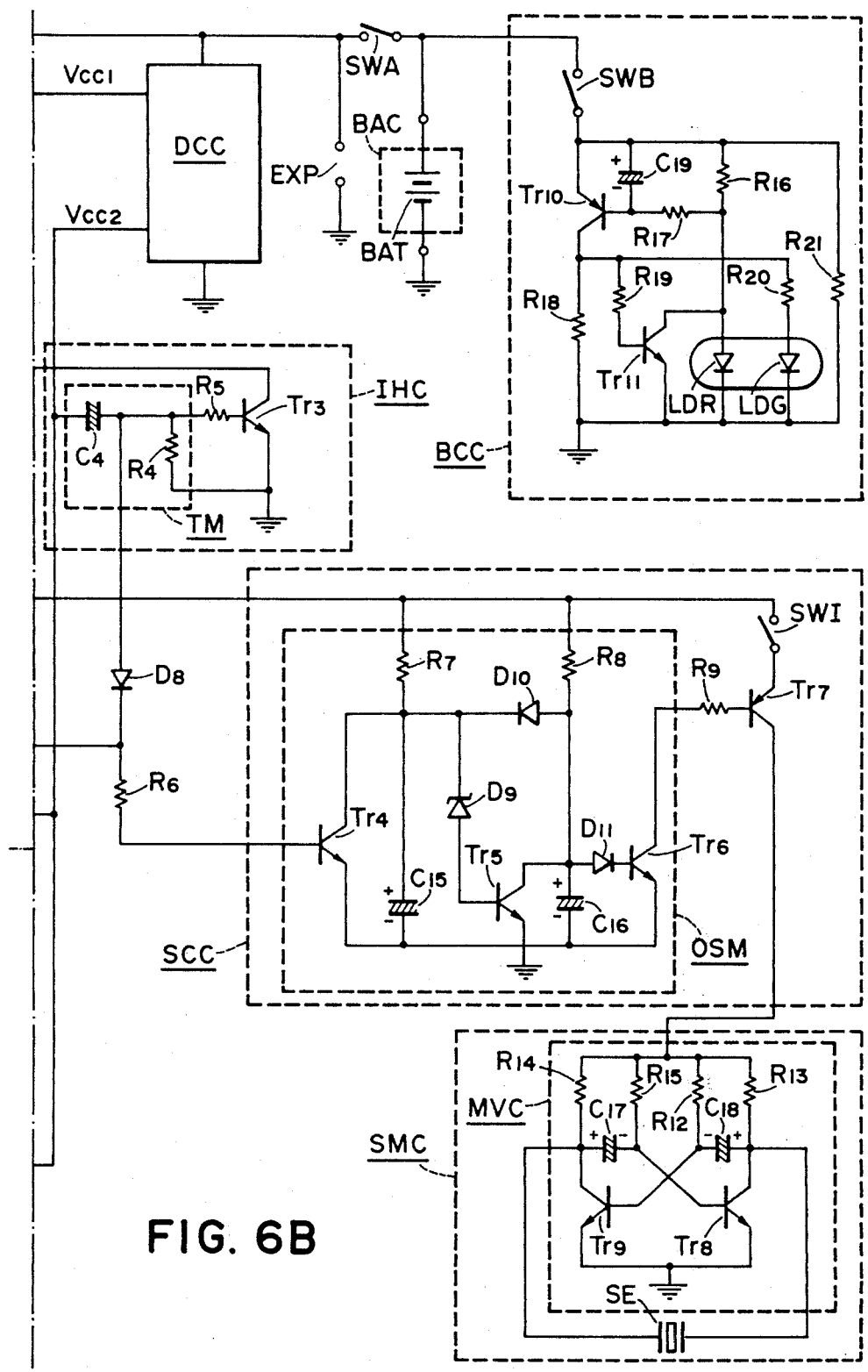
Figure 6C:
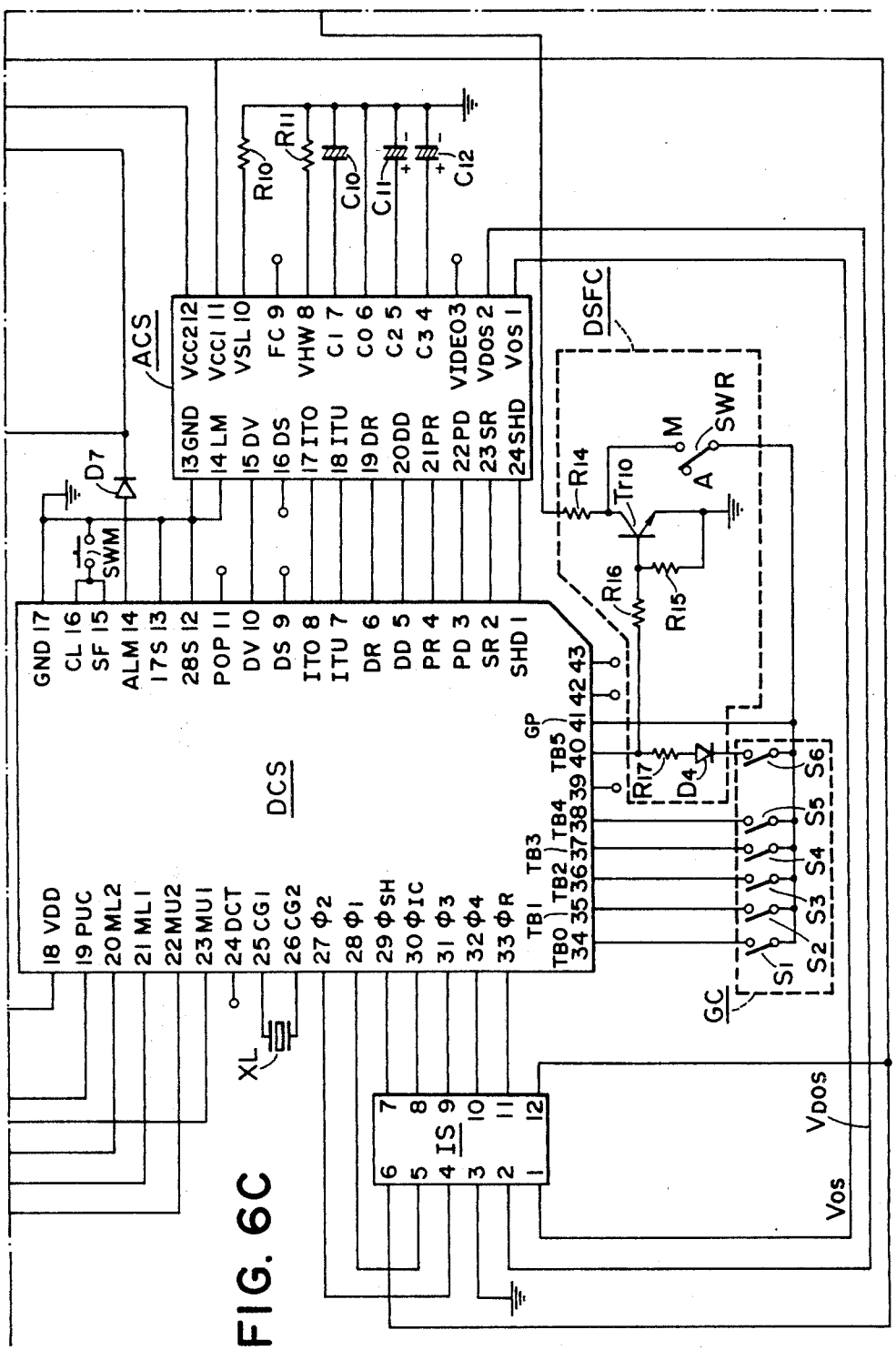

FIG. 6 shows another embodiment of the invention.

In this figure, like characters to FIG. 3 represent the same elements and therefore detailed description thereof will be omitted unless absolutely necessary for understanding of this embodiment.

Figure 8:
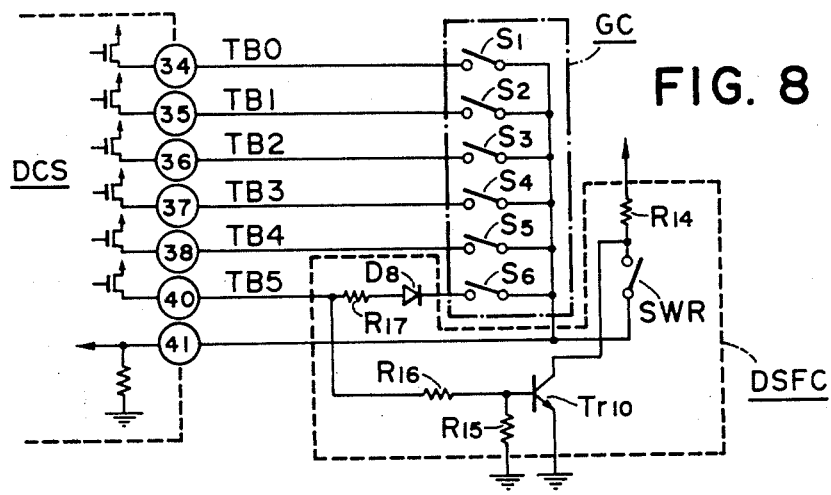
FIG. 8 is a partial circuit diagram showing the essential part of the circuit shown in FIG. 6 particularly relating to the improvement made according to the invention.

In FIGS. 6 and 8, reference character DSFC designates an automatic return circuit whose function corresponds to that of the automatic return circuit SFC shown in FIG. 3.

In the automatic return circuit DSFC, automatic return switch SWR is placed between the adjusted distance data input terminal 41 of digital-IC DCS and the Vcc2 output terminal of DC-DC converter DDC. Through the input terminal 41, the adjusted distance data (digital data) are introduced into the digital-IC DCS from the adjusted distance detecting means GC (gray code switches $S_1$–$S_6$). $Tr_{10}$ is npn switching transistor which becomes conductive by timing pulse TB5 (shown in FIG. 9) coming from the timing pulse output terminal 40 of DCS and by which the terminal 41 is connected to the circuit ground with the automatic return switch SWR being closed. $R_{14}$, $R_{15}$, $R_{16}$ and $R_{17}$ are resistors and $D_4$ is a diode.

Figure 9:
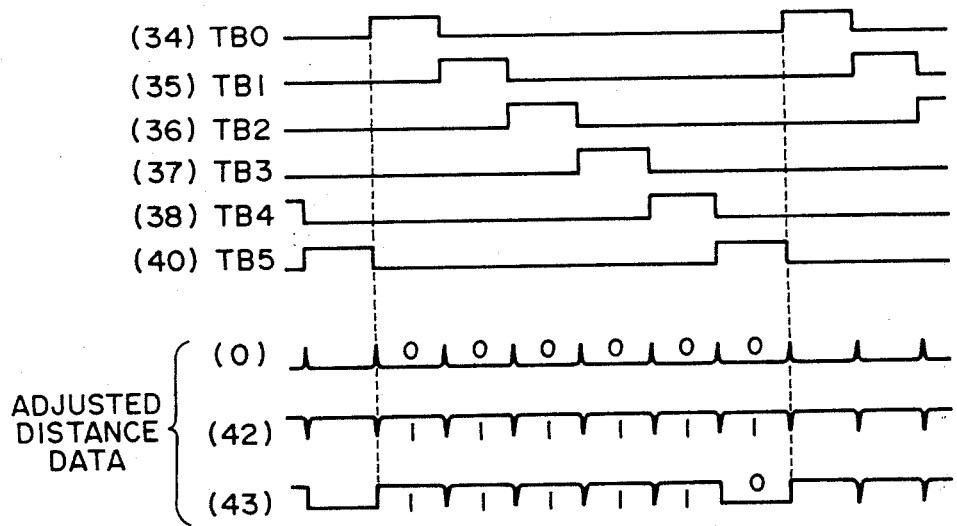
FIG. 9 is a timing chart showing how to obtain the adjusted distance data.

With this construction, if the automatic focusing switch SWA is closed with the taking optical system being set, for example, to 0.8 m in-focusing position by manual operation of the focusing ring 1, then, in respect to timing pulses TB0–TB5 (FIG. 9) produced from terminals 34–38 and 40 of the digital-IC DCS, high level signals will be taken in DCS in the case of timing of timing pulses TB0–TB4, because of the input terminal 41 being high level. On the other hand, in the case of timing of timing pulses TB5, low level signal will be taken in since the terminal 41 becomes low level (circuit ground level) as the transistor $Tr_{10}$ turns on. Therefore, the adjusted distance data which is taken in the digital-IC DCS at that time is "111110" as shown in FIG. 9 and this data is "43" in terms of binary code as shown in FIG. 7. This distance represented by the binary code "43" is at least shorter than the distance represented by binary code "42", that is, about 1.0 m. Accordingly, since the state of output signals MU1, MU2, ML1 and ML2 from the terminals 23, 22, 21 and 20 of the digital-IC DCS appearing at this time corresponds to the state of near-(forward) focus, the taking optical system is automatically returned to a position within the auto focusing range by the motor MO.

Thus, in this embodiment, even if the taking optical system is set at in-focus position to any object within the range of about 0.5 m to about 1.0 m, the taking optical system is returned automatically into the automatic focusing range at once by closing of the automatic focusing switch SWA.

Other differences in arrangement between FIG. 6 embodiment and FIG. 3 embodiment will be described hereinafter.

In this embodiment, the distance detection is started immediately by the closing of the automatic focusing switch SWA, while the distance adjusting operation for automatic focusing is started about 100 msec. later than the closing of the switch SWA.

The reason for this is as follows: in the auto-focus system disclosed in the copending application U.S. Ser. No. 121,690, from the start of the distance detection by the closing of the switch SWA to the completion of the actual object distance detection, that is, until the actual distance data is latched in a distance data latch means (the shift register $SR_7$), the content memorized in the distance data latch means is expressed in 6 bits digital word as "000000", which means "infinite distance" as is shown in FIG. 7.

Accordingly, in case that the taking optical system is adjusted to a position other than the infinite in-focus position at the time when the switch SWA is closed, the optical system is moved toward infinite in-focus position based on this data "000000" and after that, at the time of completion of the actual distance detection, it is re-adjusted toward in-focus position to the actual object based on the exact distance data latched by the distance data latch means. As such a situation is not desirable, in this embodiment, as described above, it is devised in such a manner that focus control operation of the taking optical system is started after the time lag of about 100 msec. after the closing of the switch SWA.

Such operation is given by the structures as below: In FIG. 6, IHC designated an inhibiting circuit. In this circuit IHC, TM designates a CR-timer circuit which comprises a capacitor $C_{14}$ connected to Vcc2 output terminal of the DC-DC converter DDC and a resistor $R_4$ connected to the circuit ground. $Tr_3$ designates a npn switching transistor which is connected between the terminal 20 in the focus signal output terminals 20–23 of the digital-IC DCS and the circuit ground and is receptive of the output signal of said timer circuit TM through a protective resistor $R_5$ at its base terminal. With such a construction, the timer circuit TM, in response to the power supply by the closing of the switch SWA, produces a high level signal to turn on the transistor $TR_3$, and hence to connect the terminal 20 to the circuit ground for about 100 msec. after the closing of the switch SWA.

When distance data given by the distance data latch means represents infinite distance and on the other hand, the taking optical system is set at a position other than the infinite in-focus position, it means that the taking optical system is in the near-(forward) focus condition. Therefore, in this case, the output signal MU1, MU2, ML1 and ML2 from said four terminals 23, 22, 21 and 20 of the digital-IC DCS become low, high, low and high as shown in near-(forward) focus in FIG. 5. Accordingly, the focusing motor MO is operated in order to move the taking optical system toward infinite in-focus position.

On the other hand, at this time, as is described above, the terminal 20 must be connected to the circuit ground, and hence the focus signal ML2 must be set at low by the operations of the inhibiting circuit IHC till about 100 msec. passes after the closing of the switch SWA. Accordingly, in the motor control circuit MCC, the transistors $Q_3$, $Q_7$, $Q_4$ and $Q_8$, become non-conductive state, and by this the focusing motor MO is set to non-operation during this approximate 100 msec.

Thus, the focus control operation of the taking optical system is prohibited after closing of the switch SWA till the delay time of about 100 msec. passes and lens control operation starts after this approximate 100 msec. of delay time passes.

Further, in this embodiment, annunciation of in-focus condition of the taking optical system onto the object is made by "sound emission".

That is, in FIG. 6, four diodes $D_5$, $D_6$, $D_7$ and $D_8$ constitute a NOR-logic circuit which receives each output signal from an alarm signal output terminal 14 and the focus control signal output terminals 23 and 22 of the digital-IC DCS, and further, the output signal from said timer circuit TM, and which produces a high level signal only when all of these four input signals are of low level.

SCC designates a sound emission control circuit. In this circuit SCC, OSM designates a one-shot multi-vibrator circuit which comprises transistors $Tr_4$, $Tr_5$ and $Tr_6$, capacitors $C_{15}$ and $C_{16}$, resistors $R_7$ and $R_8$ and diodes $D_9$, $D_{10}$ and $D_{15}$ and produces a high level signal for about 300 msec. in response to the high level output of said NOR-logic circuit (diodes $D_5$–$D_8$) being imparted through a protective resistor $R_6$. $Tr_7$ designates a pnp switching transistor which turns on for about 300 msec. in response to the high level output of said one-shot multi-vibrator circuit OSM being imparted at its base terminal through a protective resistor $R_9$.

SMC designates a sound emission circuit. In this circuit SMC, MVC designates a multi-vibrator circuit which comprises capacitors $C_{17}$ and $C_{18}$, resistors $R_{12}$, $R_{13}$, $R_{14}$ and $R_{15}$ and transistors $Tr_8$ and $Tr_9$ and operates (oscillates) by the power supply (Vcc2) when said transistor $Tr_7$ turns on. To the output stage of said multi-vibrator circuit MVC, a sound emitting element SE is connected.

With such a construction, the in-focus state of the taking optical system onto the object is annunciated for about 300 msec. by the sound emission through the sound emitting element SE only when the following three conditions are satisfied:

(1) the alarm signal ALM from the terminal 14 of the digital-IC DCS becomes low level as the distance detection is terminated;

(2) both signals MU1 and MU2 from the terminals 23 and 22 of the digital-IC DCS become low level as the taking optical system is adjusted to in-focus position onto the object on the distance data obtained through the distance detection; and further, (3) the output of the timer circuit TM becomes low level after the lapse of the delay time of about 100 msec. after the closing of the switch SWA.

Exactly, said in-focus annunciation is started after the delay time of about 30 msec. after said three conditions are satisfied, due to the response delay of the one-shot multi-vibrator circuit OSM.

This in-focus annunciation can be inhibited by keeping an inhibit switch SWI open, which is operable manually from outside of the lens assembly.

Again referring to FIG. 6, two focus mode set terminals 15 and 16 of the digital-IC DCS are connected with each other and a mode control switch SWM is provided between the two terminals and the circuit ground. On-off of the mode control switch SWM is controlled by the battery case BAC containing therein the power source battery BAT. When the mode control switch SWM is off and, therefore, both of the terminals 15 and 16 are open, the focusing operation proceeds in a mode as described as continuous focus mode of full automatic modes of servo focus in the above referred copending application U.S. Ser. No. 121,690. In this mode, the automatic focusing operation is effected continuously (therefore the automatic focusing can follow the change of the object distance) so long as the automatic focusing switch SWA remains closed. On the contrary, when the mode control switch SWM is turned on and, therefore, terminals 15 and 16 are grounded, the automatic focusing operation proceeds in a mode as described as one more focus mode of semi-automatic modes in the copending application. In this mode, one automatic focusing operation is effected every closing of the automatic focusing switch SWA. Therefore, in this mode, the focusing operation can not follow the change of object distance occurring after an in-focus state has once been obtained unless the automatic focusing switch SWA is closed once more.

The structure of mode control switch SWA will be described in detail hereinafter with reference to FIGS. 10 and 11 wherein like characters to the figures already shown represent the same and corresponding elements.

Figure 11:
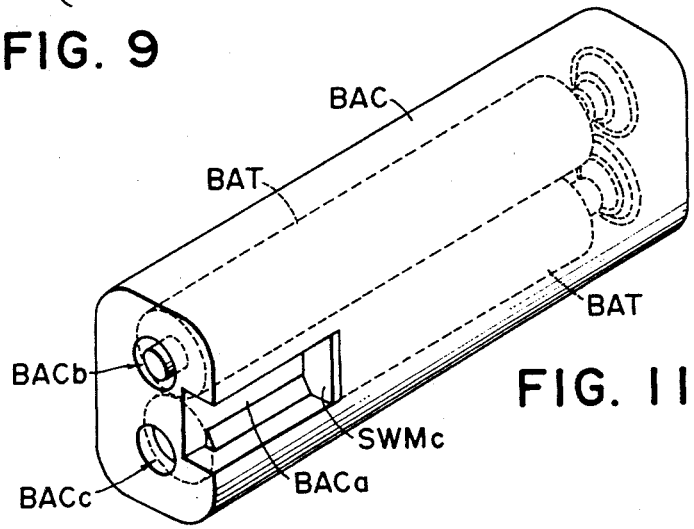
FIG. 11 is a perspective view of a battery unit to be loaded into the taking lens shown in FIG. 10.

As shown in FIG. 11, the battery case BAC containing therein power source batteries BAT has a recessed portion BACa formed in a portion of the battery case. On the other hand, as seen in FIG. 10, the lens assembly LA has a battery case receiving portion in which the mode control switch SWM is mounted. Two terminals SWMa and SWMb of the mode control switch SWM project in the direction in which the battery case BAC is inserted. $T_1$ and $T_2$ are connection terminals for connection to the batteries. The connection terminals $T_1$ and $T_2$ in the case receiving portion project toward the direction in which the battery case BAC is inserted in the case receiving portion. When the battery case is inserted, the projecting connection terminals $T_1$ and $T_2$ put into the corresponding holes BACb and BACc (FIG. 11) provided in the battery case BAC so that there is obtained an electric contact between the connection terminals and the batteries.

If there is provided an electric conductive member SWMc at the bottom of the recessed portion BACa of the battery case BAC, then the conductive member SWMc will come into contact with the terminals SWMa and SWMb to turn on the mode control switch SWM when the battery case is inserted. If there is not provided such an electric conductive member SWMc, the mode control switch SWM is off. In this manner, any one of the above two focus control modes can be selected depending upon whether or not such electric conductive member SWMc is provided on the battery case BAC.

Figure 10:
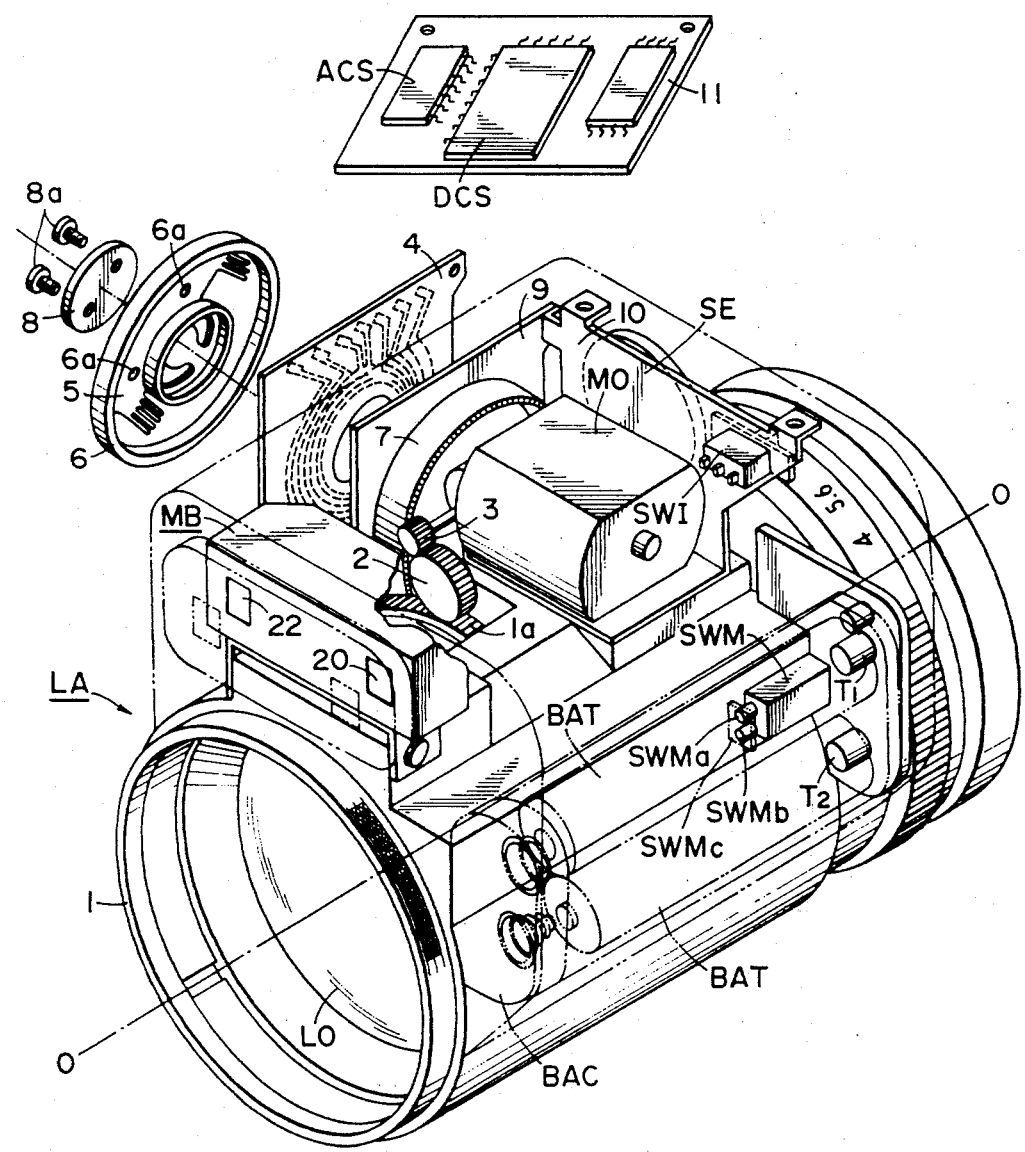
FIG. 10 is a perspective view of an exchangeable taking lens useful for the single lens reflex camera in which the embodiment shown in FIG. 6 is incorporated.

In FIG. 10, reference numerals 9 and 10 designate vertical plates. On the vertical plate 9 there is mounted the above mentioned printed board 4 and on the other vertical plate 10 there are mounted the above mentioned sound emission element SE and inhibiting switch SW1. 7 is a crown wheel which is driven into rotation by motor MO through the gear 3. The above mentioned brush member 5 is mounted on the inside surface of a rotary disc 6 by means of screw 6a. The crown wheel 7 has a rotating shaft extending therefrom. The disc 6 is adjustably mounted on the fore end of the rotating shaft by means of screw 8a and washer 8 with the vertical plate 9 and the printed board 4 being sandwiched in between the crown wheel 7 and disc 6 in such manner that the brush member 5 can contact with code patterns on the printed board 4. Designated by 11 is a circuit base plate for supporting thereon the analog-IC ACS, digital-IC DCS and other circuit elements. The base plate 11 is fixed to the vertical plates 9 and 10 in such manner as to cover the motor MO. LO is a taking optical system whose optical axis is designated by 0. The gear 2 is in mesh with a gear part 1a formed on a portion of the focusing ring 1.

In FIG. 6, reference character EXP designates a connection terminal which is used when an external power source is used instead of the mounted-in battery BAT. BCC is a battery checking circuit including a battery checking switch SWB. When the switch SWB being closed and the voltage of battery BAT is higher than a determined reference voltage Vref (about 2.4 volt), that is, the sum of the base-emitter voltage of npn-transistor $Tr_{10}$ (about 0.6 volt) and the forward fall voltage of light emitting diode LDR (about 1.8 volt), the light emitting diode LDG is placed on while the diode LDR is off as the npn-transistor $Tr_{11}$ becomes conductive at the time. If the battery voltage is lower than the reference voltage Vref but higher than the forward fall voltage of the diode (about 1.8 volt), then the transistor $Tr_{10}$ is turned off and therefore the transistor $Tr_{11}$ is also turned off. As a result, the light emitting diode LDR is placed on this time while the diode LDG is off. When the battery voltage is lower than the forward fall voltage of LDR (about 1.8 volt), neither LDG nor LDR is placed on.

The voltage level required for the battery to operate the circuit shown in FIG. 6 is more than about 2 volt. Thus, lighting of diode LDG indicates that the battery is OK and lighting of LDR is a warning signal indicating that the battery should be replaced by a new one. When neither LDG nor LDR lights on, it is indicative of inoperative state of the circuit system. To this end, there may be used, for example, a green light emitting diode as LDG and a red light emitting diode as LDR.

$C_{19}$ is a capacitor for cutting off noise and $R_{21}$ is a dummy resistor. $R_{16}$–$R_{20}$ are resistors.

While the invention has been particularly shown and described with reference to preferred embodiments thereof, it will be understood by those skilled in the art that the foregoing and other changes in form and details can be made therein without departing from the scope of the invention.

What I claim is:

1. A focusing system comprising:
   (A) a focus adjustable optical system;
   (B) an automatic focusing device for automatically focusing said optical system within a predetermined first focusing range;
   (C) means for operating said automatic focusing device;
   (D) manual focusing means for manually focusing said optical system within a predetermined second focusing range different from said first focusing range; and
   (E) means for assuring that said optical system can be focused automatically within said first focusing range by said automatic focusing device irrespective of the position of said optical system within said second focusing range.

2. A focusing system as set forth in claim 1, wherein said second focusing range is greater than said first focusing range.

3. A focusing system as set forth in claim 2, wherein said second focusing range includes all of said first focusing range, and includes an additional portion positioned adjacent to a minimum value limit of said first focusing range.

4. A focusing system as set forth in claim 1 or 2 or 3, wherein said assuring means includes means for forming a return signal by which said optical system is automatically returned back into said first focusing range when said operating means is brought into operation under the condition where said optical system is in a position within said second focusing range but out of said first focusing range.

5. A focusing system as set forth in claim 4, wherein said automatic focusing device comprises focus detecting means, and driving means for driving said optical system to automatically adjust the focus thereof within said first focusing range in accordance with an output of said focus detecting means; and wherein said return signal forming means includes a circuit for generating a control signal by which said optical system is returned by said driving means into said first focusing range irrespective of the output of said focus detection means when said operating means is brought into operation under the condition where said optical system is in a position within said second focusing range but out of said first focusing range.

6. A focusing system as set forth in claim 5, wherein said return signal forming means further includes means for setting said control signal generating circuit at an operable position so long as said optical system is in an adjusted position within said second focusing range but out of said first focusing range.

7. A focusing system as set forth in claim 6, wherein said setting means comprises:
   a control switch for setting said control signal generating circuit at the operable position; and
   a control cam formed to continuously actuate said control switch so long as said optical system is in an adjusted position within said second focusing range but out of said first focusing range.

8. A focusing system as set forth in claim 4, wherein said automatic focusing device comprises focus detecting means, and driving means for driving said optical system to automatically adjust the focus thereof within said first focusing range in accordance with the output of said focus detecting means; and wherein said return signal forming means includes a circuit for altering an input to said focus detecting means in such a manner that the output from said focus detecting means becomes an output for instructing said driving means to return said optical system into said first focusing range when said operating means is brought into operation under the condition where said optical system is within said second focusing range but out of said first focusing range.

9. A focusing system as set forth in claim 8, wherein said focus detecting means is formed to produce an output for controlling said driving means to focus said optical system onto an object on a basis of data of the distance from said optical system to said object and data of actually adjusted distance; and wherein said altering circuit is formed to alter input data of the actually adjusted distance in such a manner that the output of said focus detecting circuit becomes an output for instructing said driving means to return said optical system into said first focusing range.

10. A focusing system as set forth in claim 9, wherein said return signal forming means further includes means for setting said input altering circuit to its operable position so long as said optical system is in an adjusted position within said second focusing range but out of said first one.

11. A focusing system as set forth in claim 10, wherein said setting means comprises:
    a control switch for setting said input altering circuit to its operable position; and
    a control cam so formed as to continue actuating said control switch so long as said optical system is in an adjusted position within said second focusing range but out of said first one.

12. A focusing system as set forth in claim 8, wherein said return signal forming means further includes means for setting said input altering circuit at an operable position so long as said optical system is in an adjusted position within said second focusing range but out of said first focusing range.

13. A focusing system as set forth in claim 12, wherein said setting means comprises:
- a control switch for setting said input altering circuit at the operable position; and
- a control cam formed to continuously actuate said control switch so long as said optical system is in an adjusted position within said second focusing range but out of said first focusing range.

* * * * *

UNITED STATES PATENT AND TRADEMARK OFFICE
CERTIFICATE OF CORRECTION

PATENT NO. : 4,402,586

DATED : September 6, 1983

INVENTOR(S) : TOSHIKAZU ICHIYANAGI

It is certified that error appears in the above-identified patent and that said Letters Patent is hereby corrected as shown below:

Col. 1, line 37, change "devices" to --device--.

Col. 3, line 5, change "DRAWING" to --DRAWINGS--.

Col. 6, line 11, change "referred" to --noted--.

Col. 7, line 7, change "on. While" to --on, while--.

Col. 14, line 41 (Claim 9, line 4)

change "on a basis of data of the" to --on the basis of data of a--;

line 49 (Claim 10, line 1)

change "claim 9" to --claim 8--;

line 51 (Claim 10, line 3)

change "to its" to --at an--

UNITED STATES PATENT AND TRADEMARK OFFICE
CERTIFICATE OF CORRECTION

PATENT NO. : 4,402,586

DATED : September 6, 1983

INVENTOR(S) : TOSHIKAZU ICHIYANAGI

It is certified that error appears in the above-identified patent and that said Letters Patent is hereby corrected as shown below:

Col. 14, line 54 (Claim 10, line 6)

change "one" to --focusing range--;

line 58 (Claim 11, line 4)

change "to its" to --at the--;

line 59 (Claim 11, line 5)

change "so formed as to continue actuating" to --formed to continuously actuate--;

line 62 (Claim 11, line 8)

change "one" to --focusing range--;

line 63 (Claim 12, line 1)

change "claim 8" to --claim 9--.

Signed and Sealed this

Fifth Day of June 1984

[SEAL]

Attest:

GERALD J. MOSSINGHOFF

Attesting Officer     Commissioner of Patents and Trademarks